Jan. 25, 1949.  E. C. MAXWELL  2,459,829
POWER TRANSMISSION
Filed April 29, 1946
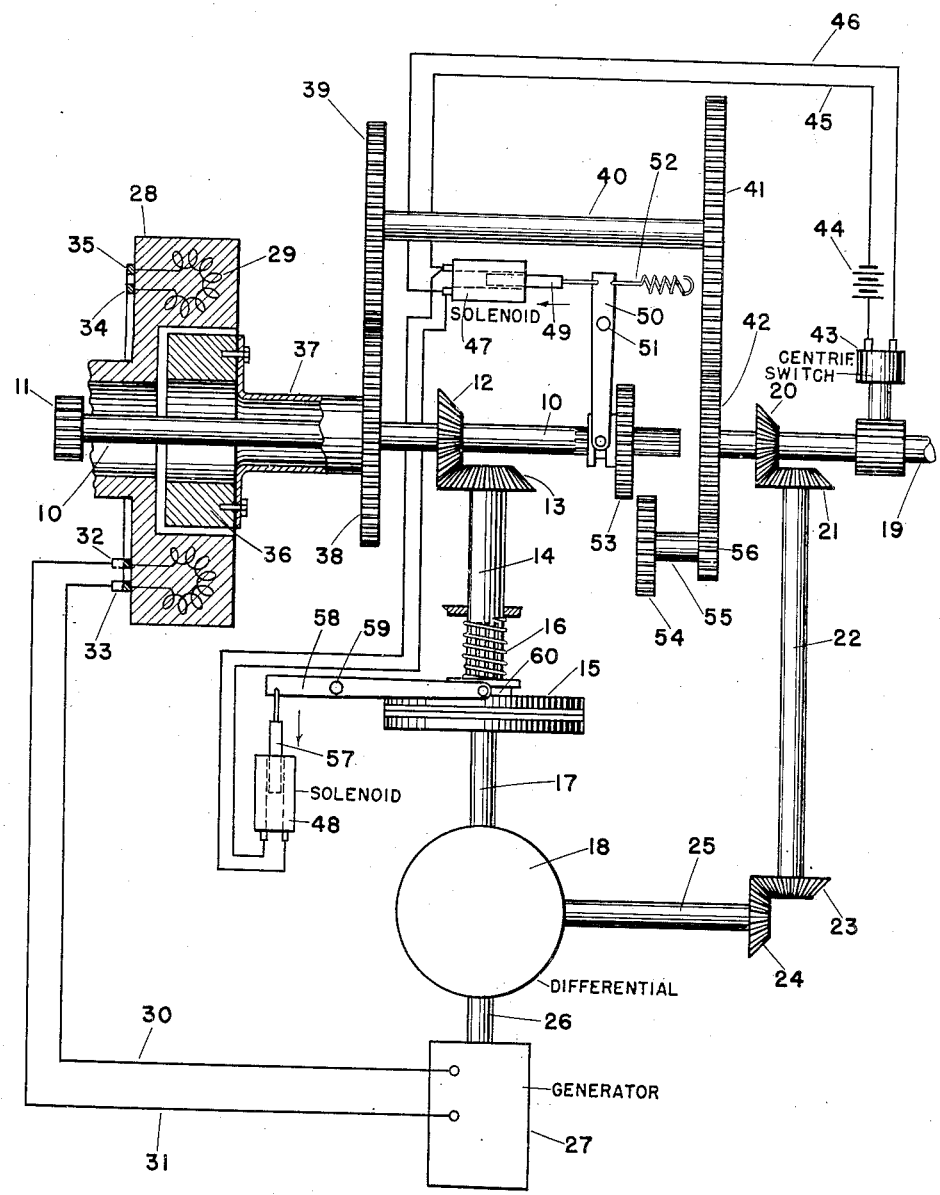
Inventor
EDWARD C. MAXWELL
By M. O. Hayes
Attorney Patented Jan. 25, 1949

2,459,829

UNITED STATES PATENT OFFICE 2,459,829

POWER TRANSMISSION

Edward C. Maxwell, United States Navy

Application April 29, 1946, Serial No. 665,711

8 Claims. (Cl. 172—284)

(Granted under the act of March 3, 1883, as amended April 30, 1928; 370 O. G. 757)

This invention relates to transmission devices and more particularly to power transmission devices wherein power from a prime mover may be connected either through electrical torque mechanism or directly so as to drive a load as desired.

Heretofore many methods have been proposed for the transmission of power through shafting, and wherein so-called electromagnetic clutches have been employed to permit a desired amount of slippage between the relatively rotating parts and permit operation of a prime mover at a speed wherein the moment of its torque is greatest.

However, such prior devices have a number of undesirable features, are frequently complicated and inherently unsatisfactory, and frequently prove to be insufficiently flexible for the desired use.

It is the purpose of the present invention to provide a new and improved power transmission mechanism whereby a desired degree of coupling effect may be achieved between relatively rotatable parts so that a prime mover such, for example, as an internal combustion engine may be operated at speeds wherein maximum torque may be provided, but the load to be driven can be operated at the desired low, intermediate or high speeds.

Another object of the present invention is to provide a simple and reliable coupling mechanism of the electrical type wherein an inductive field of greater or lesser intensity as required is employed to provide a variable drive for the driven members.

An additional object is to provide an electric current supply which may vary in accord with load conditions.

It is a further object of the present invention to provide an automatic electrical drive and coupling arrangement which is operated upon attainment of a desired speed to couple the prime mover to the driven member in a direct fashion.

Other objects and advantages will be apparent from the following specification and accompanying drawing, in which latter is illustrated a schematic diagram of a construction embodying the present invention.

Referring to the accompanying drawing, in the embodiment illustrated there is provided a driving shaft 10 having an end gear 11 by which it may be connected for rotation to a suitable prime mover (not shown), such for example as an internal combustion engine. The shaft 10 has keyed therein a beveled gear 12 through which power may be communicated to a companion gear 13 keyed to and rotating stub shaft 14. Through the medium of this shaft 14 and a solenoid operated clutch 15 there is driven one shaft 17 of a differential member 18. The clutch 15 is ordinarily kept in engaging position by means of a coiled spring 16.

The driven member such, for example, as the rear wheels of an automobile may be driven through a suitable driven torque tube 19, or the like, which may have suitable universal joint means (not shown). Driven torque tube 19 has keyed thereto a beveled gear 20 which meshes with coupling gear 21 keyed to a transversely extending stub shaft 22 and by companion beveled gears 23 and 24 power is communicated to differential shaft 25. The shaft 25 forms one of the differential extensions. A generator drive shaft 26 extending from the differential housing drives the armature of a generator 27 to provide electric current. It will be apparent that with the torque tube 19 stationary as when the rear wheels of an automobile are stationary and with the differential shaft 25 stationary, rotation of the drive shaft 10 through bevel gears 12 and 13, clutch 15 and differential 18 will rotate the shaft 26 and generator 27 to generate an electric current.

As part of the electrical coupling mechanism there is provided a flywheel 28 which is directly rotated at a desired speed by the engine or other prime mover. This flywheel may include current conducting coils 29 adapted to establish a magnetic field and in use electricity is conducted from the generator 27 through wires 30 and 31 to inner and outer brushes 32 and 33 which engage corresponding slip rings 34 and 35. Of course, any suitable means may be employed to conduct the electric current to the coils 29 and the current collecting arrangement shown is only illustrative. As the prime mover rotates the generator faster and faster more and more magnetic field is created by the increased current flowing through coils 29. This causes the core 36 to follow the rotation of the flywheel 28.

The core 36 is supported upon one end of a tubular shaft 37 which may be suitably mounted in bearings, and upon the opposite end may be a spur gear 38. The spur gear 38 meshes with a companion spur gear 39 mounted upon one end of a counter shaft 40 and having at its opposite end another spur gear 41. This latter gear 41 meshes with a spur gear 42 mounted upon the end of the driven torque tube 19. It will be apparent that the rotation of the core 36 induced by the increasing magnetic field compels rotation of sleeve 37 gears 38, 39, 41 and 42 and drives the tube 19.

As the speed of rotation of the driven torque tube 19 increases it may drive a centrifugal switch device 43 at increasing speed until, at a predetermined speed such, for example, as 35 miles per hour, the centrifugal switch may be brought to close a circuit including battery 44 and wires 46 to energize solenoids 47 and 48 which are connected in parallel in the embodiment shown for simultaneous energization by the closing of the centrifugal switch 43.

Energizing solenoid 47 draws solenoid core 49 to the left, in the direction of the arrow, and rotates lever 50 about fulcrum point 51 against the resistance of spring 52. The lower end of lever 50 may include a yoke, or other suitable arrangement, whereby spur gear 53 which is splined for axial movement along shaft 10 may be moved along the splined portion to a position whereby it engages with a companion spur gear 54 mounted upon stub shaft 55 and, through another spur gear 56 meshing with gear 42, may drive the torque tube 19.

The above operation effects a direct drive between the shaft 10 to the driven member 19 through the medium of the gears 53, 54, 56 and 42 as aforesaid.

Since the solenoid 48 is electrically connected in parallel with the solenoid 47 it is simultaneously energized by the operation of the centrifugal switch to draw a core 57 downwardly whereby to move a lever 58 about its fulcrum 59 to cause the opposite end, which may be yoked in a suitable fashion and engages with a grooved collar 60, to move the upper plate of clutch 15 upwardly along the splined end of the shaft 14, compressing the spring 16 to stop driving the differential stub shaft 17. When this occurs the generator driven shaft 26 will stop since the rotation of the differential shaft 25 through the medium of the driven shaft 19 is dissipated in the free rotation of the now unloaded differential shaft 17.

In the present specification an embodiment of the present invention has been shown and described as applied to a vehicle such as an automobile. However it will be obvious that the fundamental principles may readily be applied to any suitable power transmission mechanism such, for example, as a gun power drive or other drive mechanism wherein it is desired to effect a smooth and variable transmission of power.

While a particular embodiment of the invention is shown, it will be understood that it is not desired to be limited to the embodiment shown since many modifications may be made, and it is, therefore, contemplated by the appended claims to cover any such modifications as fall within the true spirit and scope of this invention.

The invention described herein may be manufactured and used by or for the Government of the United States of America for governmental purposes without the payment of any royalties thereon or therefor.

I claim:

1. A variable speed power transmission comprising, a driving member, a driven member, means for providing a variable degree of interconnection between said driven and driving members including a magnetic clutch, a differential member connected between said driving and driven members, a current generating means for the magnetic clutch, said current generating means being driven by said differential member, the differential member rotating the current generating means at a speed which varies with the difference in relative rotation between the driving member and the driven member.

2. A variable speed power transmssion comprising, a driving member, a driven member, means for interconnecting the driving member and the driven member for variable speed operation including a magnetic clutch, means for generating current for operation of the magnetic clutch, and means for varying the amount of current so generated in accord with the changes in relative speed of the driving and driven members.

3. A variable speed power transmission comprising, a driving member, a driven member, means for flexibly interconnecting the driving member and the driven member including a magnetic coupling, and a generator to provide electric current to the magnetic coupling, said generator being driven by a differential mechanism, a portion of the differential mechanism being connected to the driving member and another portion of the differential mechanism being connected to the driven member whereby relative rotation of the driving member with the driven member stationary will generate an electric current of high value and increased rotation of the driven member will reduce the rate of relative rotation of the current generating means.

4. A variable speed power transmission comprising, a driving member, a driven member, an electromagnetic coupling between the driving and the driven members, a generator operably connected to the driving member and the driven member for rotation thereby, power combining means including a differential having two rotatable members connected to the driving member and the driven member respectively and through a third rotatable member driving the generator to supply current to the electromagnetic coupling, and means for disconnecting the differential from the driving member.

5. A variable speed power transmission comprising, a driving member, a driven member, magnetic clutch means between the driving member and the driven member, a generator connected to said magnetic clutch means and having coupling means connecting it to the driving member, a direct drive coupling means between the driving member and the driven member, a centrifugal switch driven by the driven member and a solenoid system energized by the centrifugal switch upon reaching a predetermined speed to disconnect one of said coupling means and connect the other.

6. A variable speed power transmission comprising driving and driven members, means providing a magnetic coupling between said members, a generator for supplying current to said means, a differential unit driven by said driving member and differentially connected to said generator and said driven member, and mechanism for uncoupling the generator from said driving member.

7. A variable speed power transmission comprising driving and driven members, means providing a magnetic coupling between said members, a generator for supplying current to said means, mechanism for establishing a positive driving connection between said members, means coupling said generator to said driving member, and mechanism automatically responsive to torque load on said driven member for simultaneously establishing said positive driving connection and uncoupling said generator from said driving member.

8. In the apparatus of claim 7 a differential unit interposed between said driving member and said generator and also coupled to said driven member.

EDWARD C. MAXWELL.

REFERENCES CITED

The following references are of record in the file of this patent:

UNITED STATES PATENTS

| Number | Name | Date |
|---|---|---|
| 1,451,465 | Neuland | Apr. 10, 1923 |
| 1,504,951 | Hall | Aug. 12, 1924 |
| 1,848,091 | Winther | Mar. 1, 1932 |
| 1,995,605 | Downing | Mar. 26, 1935 |